United States Patent [19]
Fujita et al.

[11] Patent Number: 5,685,163
[45] Date of Patent: Nov. 11, 1997

[54] REFRIGERATING APPARATUS

[75] Inventors: Makoto Fujita; Yoshikazu Amo, both of Shimizu, Japan

[73] Assignee: Hitachi, Ltd., Tokyo, Japan

[21] Appl. No.: 528,037

[22] Filed: Sep. 14, 1995

[30] Foreign Application Priority Data

Sep. 20, 1994 [JP] Japan .................. 6-224769

[51] Int. Cl.$^6$ .............. F25B 43/00; F25B 41/00
[52] U.S. Cl. .............. 62/211; 62/114; 62/228.3; 62/474
[58] Field of Search .............. 62/114, 505, 211, 62/474, 228.3

[56] References Cited

U.S. PATENT DOCUMENTS

| | | | |
|---|---|---|---|
| 5,103,652 | 4/1992 | Mizuno et al. | 62/505 |
| 5,277,834 | 1/1994 | Bivens et al. | 62/114 |
| 5,295,357 | 3/1994 | Kaneko | 62/114 X |

FOREIGN PATENT DOCUMENTS

| | | |
|---|---|---|
| 59-84049 | 11/1982 | Japan . |
| 3-63461 | 7/1989 | Japan . |
| 5-172408 | 12/1991 | Japan . |

*Primary Examiner*—William E. Wayner
*Attorney, Agent, or Firm*—Antonelli, Terry, Stout & Kraus, LLP.

[57] ABSTRACT

A liquid injection type scroll compressor is used to a refrigerating apparatus using hydrocarbon fluoride refrigerant which does not contain chlorine (HFC-125/HFC-143a/HFC-134a) as an operating fluid and an amount of an injected liquid is controlled according to a discharge temperature of the compressor. Further, ester oil is used as refrigerator oil and a dryer is disposed in a refrigerating cycle. With this arrangement, a refrigerating cycle operation can be stably realized in a wide range without almost changing the arrangement of a conventional refrigerating apparatus.

23 Claims, 3 Drawing Sheets

REFRIGERATING APPARATUS

BACKGROUND OF THE INVENTION

1. Field of the Invention

The present invention relates to a refrigerating apparatus used to air conditioners, refrigerators and the like, and more specifically, to a refrigerating apparatus using a mixed refrigerant which does not contain chlorine.

2. Description of the Prior Art

Conventionally, so-called hydrocarbon fluoride refrigerants containing chloride such as CFC, HCFC and such like are widely used as an operating fluid for a refrigerating cycle because they are a most suitable substance as a refrigerant due to their excellent thermodynamic property and stability.

As described in, for example, Japanese Patent Publication Laid-Open No. 3-63461, Japanese Patent Publication Laid Open No. 59-84049, Japanese Patent Publication Laid-Open No. 5-172408 and the like, it is well known that refrigerating apparatuses using these refrigerants prevent the overheat of compressors and achieve a wide range of an operating pressure.

Hydrocarbon fluoride substances containing chloride are not decomposed due to their stability and reach the stratosphere by convection. It is found that since these substances are decomposed by strong ultraviolet rays in the sky and separate chlorine atoms which react with ozone, they have an action for destroying the ozone layer. It is determined to entirely abolish the hydrocarbon fluoride substances containing chloride to protect the ozone layer which has a function to cut off ultraviolet rays harmful to human bodies in the sky. Although HCFC-22 which is widely used as a refrigerant for air conditioners and refrigerators is also an object to be abolished, since it is less effective to the destruction of the ozone layer than CFCs designated as specific Freons, a longer period of grace is admitted to the substance. It is essential to develop replacement refrigerants and refrigerating apparatuses applicable to the replacement refrigerants in the period of grace.

At present, HFC-32, HFC-25, HFC-134a, HFC-143a, HFC-152a and such like, for example, as hydrocarbon fluoride refrigerants which do not contain chloride causing the destruction of the ozone layer are examined as new refrigerants to be replaced with conventional refrigerants such as HCF-C22 and such like and any one of them or a combination of a plurality of them is influential. Development is carried out aiming at a refrigerant having a performance factor such as a refrigerating capacity, efficiency and the like and a cyclic state such as an operating pressure, temperature and the like equivalent or near to those of conventional refrigerants. This is because that a caution is paid to permit the replacement refrigerants to be handled in the same manner as conventional refrigerants so that the new refrigerants can be employed with a minimum change of the specification of products and manufacturing apparatuses which have been applied to conventional refrigerants.

Incidentally, a compressor, cycle auxiliary components and a cycle control device must be arranged to comply with the new refrigerants so that a performance equivalent to that of conventional products is maintained and a cycle state such as a range of an operating pressure, temperature and the like is stabilized at all times. Further, when different refrigerants are used, refrigerator oils must be also changed to comply with the new different refrigerants. That is, although chlorine has a function for assisting compatibility with oil, new refrigerants do not contain chloride causing the destruction of the ozone layer as described above. Thus, the compatibility of the new refrigerants with conventional refrigerator oils, which are mainly composed of mineral oils, alkylbenzene and such like and have been widely used to conventional refrigerants, is greatly lowered and thus the new refrigerants cannot be used with the conventional refrigerator oils. To cope with this problem, there is developed new refrigerator oil which can secure the compatibility with the new refrigerant by the molecular polarity of ether and ester.

Incidentally, when conventional refrigerator oil and a chlorine substance contained in a conventional refrigerant are mixed in a refrigerating cycle to which a new refrigerant is applied, the new refrigerant and new refrigerator oil are chemically changed by the mixing of them, and, for example, a material used in the cooling cycle may be corroded by the occurrence of acid. Thus, a problem arises in that the reliability of products is greatly lowered.

SUMMARY OF THE INVENTION

An object of the present invention is to provide a refrigerating apparatus which can realize a cycle state such as a performance, operating pressure, temperature and the like which are equivalent to that of a conventional refrigerating apparatus using a new refrigerant and new refrigerator oil while securing the reliability of components without damaging the performance thereof.

To achieve the above object, a first feature of the present invention resides in an refrigerating apparatus constituting a refrigerating cycle by sequentially connecting a compressor, a condenser, a liquid receiver, an accumulator, an expansion valve and an evaporator, wherein a mixed refrigerant containing at least R-125 and R-143a is used as a refrigerant for the refrigerating cycle, ester oil is used as refrigerator oil and a liquid injection type scroll compressor is used as the compressor.

A second feature of the present invention resides in that a triple-mixed refrigerant composed of 44 wt % of R-125, 52 wt % of R-143a and 4 wt % of R-134a is used as a refrigerant for a refrigerating cycle, ester oil is used as refrigerator oil and further a liquid injection type scroll compressor is used as a compressor.

An example of the liquid injection type scroll compressor is arranged such that the downstream side of the condenser is connected to the scroll compressor through a liquid injection piping, and means for controlling an amount of a liquid injected into the compressor is provided in the liquid injection piping.

It is preferable that the refrigerator oil is mainly composed of ester oil of fatty acid and having a dynamic viscosity of 2–70 cSt at 40° C. and 1–9 cSt at 100° C. and at least two ester linkages in a molecule. Further, the condenser can be arranged as a heat exchanger whose piping has a diameter smaller than the refrigerant piping of a heat exchanger constituting the evaporator in order to increase a heat exchanging efficiency in the condenser. An electronic expansion valve disposed to the liquid injection piping is most suitable as the liquid injection amount control means and a controller is provided to adjust an amount of an injected liquid by controlling a degree of opening of the electronic expansion valve in response to a discharge side temperature of the compressor.

A third feature of the present invention resides in a refrigerating apparatus, which comprises a refrigerating cycle composed by sequentially connecting a scroll compressor, a condenser, a liquid receiver, an accumulator, an expansion valve and an evaporator, a triple-mixed refrigerant composed of 44 wt % of R-125, 52 wt % of R-143a and 4 wt % of R-134a used as a refrigerant for the refrigerating cycle, refrigerator oil composed of ester oil, a liquid injection piping connecting the downstream side of the condenser to the scroll compressor, means provided with the liquid injection piping for controlling an amount of a liquid injected into the compressor, a revolution-controllable motor for driving the scroll compressor, a blower for supplying external air to the condenser and a revolution-controllable motor for the blower, means for detecting a discharge temperature of the compressor, means for detecting a liquid temperature of the condenser, and means for detecting a temperature of intake air to the condenser, wherein the liquid injection amount control means and the motor of the blower are controlled according to values detected by the detecting means. It is preferable to provide a pressure controller which detects a pressure of the condenser and decreases, when the pressure reaches a preset high pressure value, a capacity of the compressor by decreasing revolutions of the compressor motor, whereas increases, when the pressure reaches a present low pressure value, a capacity of the compressor by increasing revolutions of the compressor motor. Further, it is effective that when a pressure reaches the preset high pressure value, the pressure controller decreases a high pressure by controlling revolutions of the blower motor to its full speed, whereas when the pressure reaches the preset low pressure value, the pressure controller increases the high pressure by decreasing revolutions of the blower motor.

A fourth feature of the present invention resides in a refrigerating apparatus, which comprises a refrigerating cycle composed by sequentially connecting a scroll compressor, a condenser, a liquid receiver, a dryer, an expansion valve, an evaporator, a strainer and an accumulator, a triple-mixed refrigerant composes of 44 wt % of R-125, 52 wt % of R-143a and 4 wt % of R134a used as a refrigerant of the refrigerating cycle, refrigerator oil composed of ester oil, a liquid injection piping connecting the downstream side of the condenser to the scroll compressor, means provided with the liquid injection piping for controlling an amount of a liquid injected into the compressor, wherein a desiccating agent used for the dryer is composed of synthesized zeolite in which each of fine holes extending to molecule adsorbing cavities in a crystal structure has a diameter equal to or less than 3.3 angstroms which is smaller than a molecule of the hydrocarbon fluoride refrigerant which does not contain chloride and larger than a molecule of water.

A fifth feature of the present invention resides in that a double-mixed refrigerant composed of 50 wt % of R-125 and 50 wt % of R-143a is used as a refrigerant for a refrigerating cycle, ester oil is used as refrigerator oil and further a liquid injection type scroll compressor is used as a compressor.

Even the refrigerating apparatus using the above refrigerant can achieve an operating pressure, temperature and performance equivalent to those of a refrigerating apparatus using a conventional refrigerant by employing the liquid injection type scroll compressor.

That is, when an evaporating temperature is low, an amount of a refrigerant circulating in the refrigerating cycle is decreased and a temperature of a gas discharged from the compressor is increased. As a result, there is caused a danger that the compressor motor and the like may be seized, and the like. In the present invention, however, the compressor is prevented from being overheated and can be operated in a wide evaporating temperature by injecting a high pressure liquid refrigerant into the section side or intermediate compression chamber of the compressor through the pressure reduction unit.

A capillary system, an injection valve system, an electronic expansion valve system or a system combining them is employed as the liquid injection system so that a flow rate of an injected liquid can be made constant to keep a temperature of a discharged gas constant. As a result, a cycle can be stabilized and reliability can be secured.

Further, compatibility with the new refrigerant can be secured by the employment of the ester oil as the new refrigerator oil, whereby the reliability and performance of components can be secured.

As described above, the present invention can realize the refrigerating apparatus whose capacity can be controlled in a wide range covering an evaporating temperature of the evaporator of −60° C. to +5° C. using the new refrigerant which does not contain chlorine causing the destruction of the ozone layer, without almost changing the arrangement of a conventional refrigerating apparatus.

Other features, objects and merits of the present invention will become apparent from the following description when taken in conjunction with the accompanying drawings.

DESCRIPTION OF THE PREFERRED EMBODIMENTS

In this embodiment, a triple-mixed hydrocarbon fluoride refrigerant which is composed of 44 wt % of HFC-125, 52 wt % of HFC-143a and 4 wt % of HFC-134a and does not contain chlorine is used as a refrigerant for a refrigerating cycle and a liquid injection type scroll compressor is used as a compressor. Alternatively, a double-mixed hydrocarbon fluoride refrigerant which is composed of 50 wt % of HFC-125 and 50 wt % of HFC-143a and does not contain chlorine is used as a refrigerant for the refrigerating cycle. Further, ester oil (for example, disclosed in Japanese Patent Publication Laid-Open No. 4-183788) as a new refrigerator oil is used and a means disclosed in, for example, Japanese Patent Publication Laid-Open No. 5-231263 is used as a means for preventing the mixing of a chlorine substance in order to secure the reliability of an apparatus.

A specific embodiment of the present invention will be described below with reference to FIG. 1.

Figure 1:
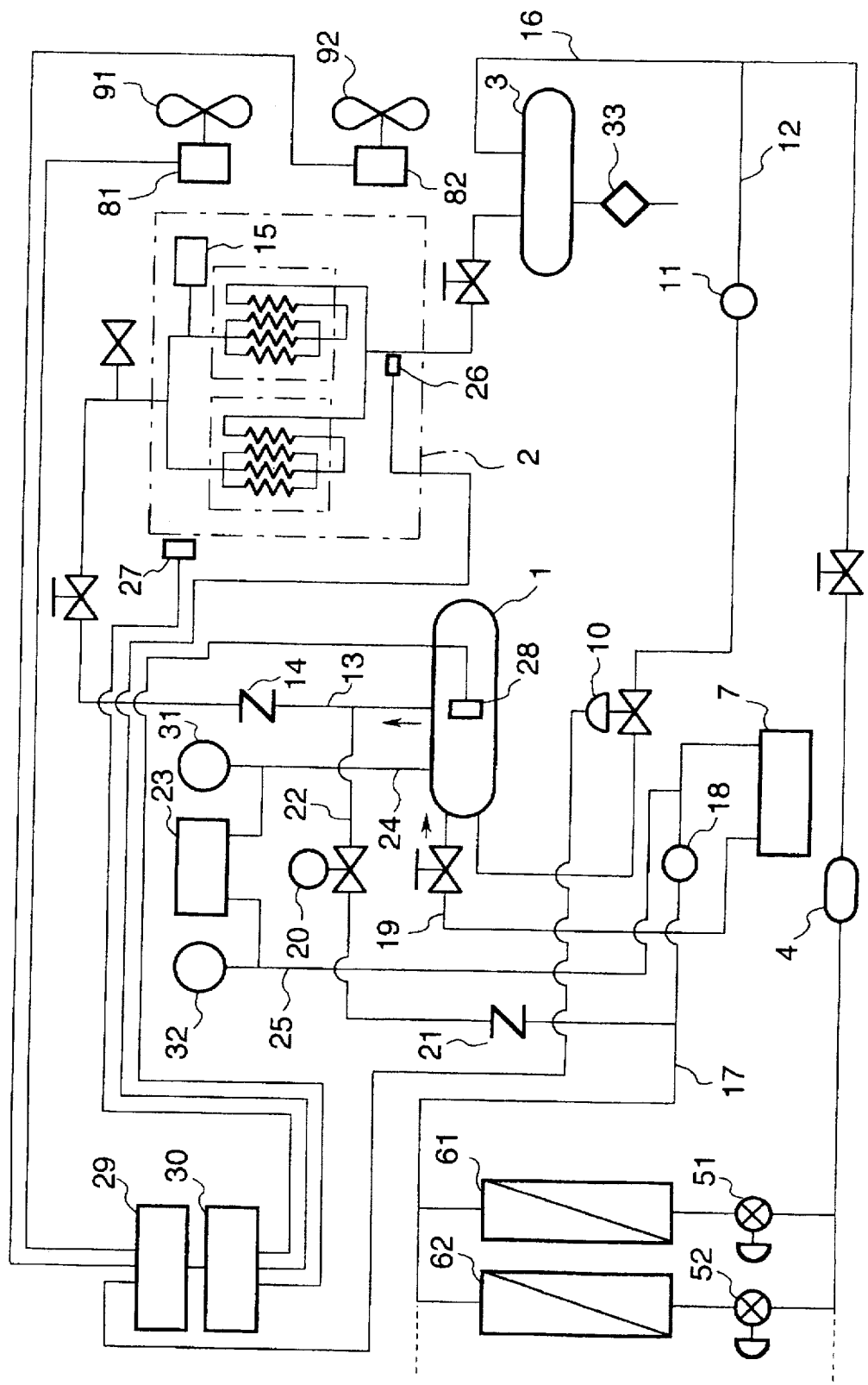
FIG. 1 is a system diagram of a refrigerating apparatus showing an example of the present invention.

As shown in FIG. 1, a refrigerating apparatus of the embodiment constitutes a refrigerating cycle by sequentially connecting a scroll compressor 1, a condenser 2, a liquid receiver 3, a dryer 4, expansion valves 51 and 52, evaporators 61 and 62, a strainer 18, and an accumulator 7.

Further, the condenser 2 is provided with two sets of blower motors 81 and 82 and propeller fans 91 and 92 for supplying external air as shown in FIG. 1.

A hydrocarbon fluoride refrigerant which does not contain chlorine causing the destruction of the ozone layer is used as a refrigerant for the refrigerating cycle.

HFC-32, HFC-125, HFC-134a, HFC-143a, HFC-152a and the like are used as this type of a refrigerant and any one of them is independently used or a plurality of them are used as a mixed refrigerant. This embodiment uses a triple-mixed refrigerant composed of 44 wt % of R-125, 52 wt % of R-143a and 4 wt % of R-134a. An alternative embodiment uses a double-mixed refrigerant composed of 50 wt % of R-125 and 50 wt % of R-143a. Refrigerator oil used for the refrigerating cycle must have good compatibility with the refrigerant. This embodiment uses ester oil as the refrigerator oil. It is found that preferably the ester oil is mainly composed of ester oil of fatty acid and has a dynamic viscosity of 2–70 cSt at 40° C. and 1–9 cSt at 100° C. and at least two ester linkages in a molecule in order to cover a temperature range of −60° C. to +5° C. which is the usual specification range of a refrigerating apparatus.

This embodiment is devised as described below to realize a refrigerating apparatus which covers the temperature range of −60° C. to +5° C. in the refrigerating cycle using the above triple-mixed refrigerant and the refrigerator oil similarly to a conventional refrigerating apparatus using a refrigerant containing chloride.

There is provided a protection switch 23 which is connected to a high pressure sensor 31 for detecting a pressure of a high pressure piping 24 and to a low pressure sensor 32 for detecting a pressure of a low pressure piping 25, respectively so as to turn off the switch of the operation circuit of a compressor motor when a limit value of a high pressure or low pressure is reached.

There is provided a pressure controller 15 which detects a pressure of the condenser 2, decreases, when the detected pressure reaches a preset high pressure value, a capacity of the compressor by decreasing the revolutions of the compressor motor and increases, when the detected pressure reaches a preset low pressure value, a capacity of the compressor by increasing the revolutions of the compressor motor. The revolutions of the compressor motor may be controlled stepwise using a motor capable of changing the number of poles or controlled continuously in accordance with a pressure value by an inverter control. Note, in this embodiment, when a pressure is reached to the preset high pressure value by the pressure controller 15, revolutions of each of the blower motors 81 and 82 is controlled to its full speed at the same time to decrease the high pressure, whereas when a pressure is reached to the preset low pressure value, the revolutions of each of the blower motors 81 and 82 is decreased to increase the high pressure.

There is provided a liquid injection piping 12 for connecting the liquid refrigerant outlet piping 16 of the liquid receiver 3 disposed downstream of the condenser to the scroll compressor 1. The liquid injection piping 12 includes a strainer 11 and an electronic expansion valve 10 and a liquid refrigerant is supplied into the intermediate pressure chamber of the scroll compressor 1 therethrough. A controller 30 calculates amounts of control of the electronic expansion valve 10 and the blower motors 81 and 82 by a previously input program in response to values detected by a thermistor 26 for detecting a liquid temperature of the condenser 2, a thermistor 27 for detecting a temperature of intake air, i.e., a temperature of outside air supplied to the condenser 2 and a thermistor 28 for detecting a discharge side temperature of the compressor 1. A control signal output unit 29 outputs control signals to the blower motors 81 and 82 for the condenser and the electronic expansion valve 10 in response to a command from the controller 30.

The condenser 2 uses a heat exchanger whose piping has a diameter smaller than that of heat exchangers constituting the evaporators 61 and 62. In this embodiment, the condenser 2 is composed of a heat exchanger whose piping has a small diameter of about 7 mm so as to cover the above temperature range of the refrigerating apparatus.

A bypass piping 22 connected to a discharge gas piping 13 is also connected to the outlet piping of the evaporators 61 and 62, i.e., to a refrigerant gas piping 17 through an electromagnetic valve 20 and a check valve 21. This is for the purpose of causing a high pressure gas to escape to a low pressure side before the compressor 1 starts and thus causing the electromagnetic valve 20 to "open" for a predetermined period of time. With this arrangement, the compressor 1 can be smoothly started by balancing cyclic pressures on a high pressure side and a low pressure side.

Next, the operation of this embodiment will be described with reference to FIG. 1.

A refrigerant gas compressed by the compressor 1 is condensed by the condenser 2 through the discharge pipe 13 and a check valve 14, supplied to the expansion valves 51 and 52 and the evaporators 61 and 62 through the liquid receiver 3, a liquid refrigerant piping 16 and the drier 4 and evaporated therein to a gas. The gas is returned to the intake side of the compressor 1 from an intake piping 19 through the refrigerant gas piping 17, the strainer 18 and the accumulator 7.

Next, the liquid injection piping 12 will be described. A degree of opening of the electromagnetic valve 10 is controlled depending upon a discharge side temperature of the compressor 1. The thermistor 28 detects the discharge temperature and compares it with a previously input and set discharge temperature. When the detected discharge temperature is higher than the set value, a degree of opening of the valve 10 is increased, whereas when the detected temperature is lower than the set value, a degree of opening of the valve 10 is decreased. That is, a degree of opening of the expansion valve 10 is continuously adjusted by the controller 30 and the control signal output unit 29. As described above, the overheat of the compressor 1 can be prevented by controlling a discharge temperature of the compressor 1 and thus a refrigerating cycle operation can be stably carried out.

Since an amount of a refrigerant dissolved in refrigerator oil is increased when an outside air temperature is low, a viscosity of the refrigerator oil is lowered. Therefore, an effect of the refrigerator oil as a lubricant to the bearing portion of the compressor is reduced and the bearing portion is worn. In this embodiment, when an outside air temperature is lower than a set temperature, a viscosity of the refrigerator oil is secured in such a manner that a degree of opening of the electronic expansion valve 10 in the liquid injection piping 12 is decreased in response to a temperature detected by the thermistor 27 so that an amount of a refrigerant supplied to the compressor 1 is decreased and a discharge side temperature of the compressor 1 is increased when it starts to reduce an amount of the refrigerant dissolved in the refrigerator oil in order to increase a viscosity of the refrigerator oil even in a slight amount. With this arrangement, the reliability of the bearing portion of the compressor can be improved.

Since a pressure at a high pressure side is increased when an outside air temperature is high, the high pressure is controlled. That is, when it is found from a temperature detected by the thermistor 26 that a temperature of a liquid refrigerant is high at the outlet of the condenser 2, the high pressure is decreased by increasing an amount of air to be supplied by increasing revolutions of the blower motors 81 and 82 for the condenser. Further, when a temperature of the liquid refrigerant is low at the outlet of the condenser 2, the high pressure is increased by decreasing the revolutions of the blower motors 81 and 82 for the condenser.

Further, when it is found from a temperature detected by the thermistor 27 that an outside air temperature is high, a high pressure is decreased by increasing an amount of air to be supplied by increasing the revolutions of the blower motors 81 and 82 for the condenser, whereas when the outside air temperature is low, the high pressure is increased by decreasing an amount of air to be supplied.

These controls are effected by controlling the revolutions of the blower motors 81 and 82 by the controller 30 and the control signal output unit 29.

When a pressure in the condenser 2 is higher than a set value, a capacity control is effected by decreasing a capacity of the scroll compressor 1 by the operation of the pressure controller 15 and revolutions of each of the blower motors 81 and 82 is set to at its full speed to decrease a high pressure. When a pressure in the condenser 2 is lower than the set value, a capacity of the scroll compressor 1 is increased by the operation of the pressure controller 15 and revolutions of each of the blower motors 81 and 82 is also decreased to increase a high pressure.

Note, the liquid receiver 3 includes a fusible plug 33 which has a function for discharging a refrigerant when it is excessively heated.

The dryer 4 has an object for removing water mixed in a refrigerating cycle. A desiccating agent, which is used to the dryer 4 in a refrigerating cycle employing the hydrocarbon fluoride refrigerant which does not contain chlorine as an operation refrigerant, is composed of synthesized zeolite in which each of fine holes extending to molecule adsorbing cavities in a crystal structure has a diameter equal to or less than 3.3 angstroms which is smaller than a molecule of the hydrocarbon fluoride refrigerant which does not contain chlorine and larger than a molecule of water. The dryer 4 may be positioned at the oil sump in the compressor 1, the oil sump of an oil separator or in the accumulator 7. In this case, the number of parts can be reduced as compared with a case that it is connected to a refrigerating cycle piping, thus a manufacturing cost can be reduced and the leakage of a gas caused by the improper mounting of it can be prevented.

Although the thermistors 26–28 are used in the above refrigerating cycle as means for detecting temperatures, an ON/OFF control by thermostats may be employed in place of the thermistors. Although a control can be continuously effected when the thermistors are used, the control is effected in an ON/OFF fashion when the thermostats are employed. Further, the above control may be effected by the controller 30 and the control signal output unit 29 by detecting pressures in place of temperatures.

Next, other examples of the liquid injecting portion in the embodiment shown in FIG. 1 will be described with reference to FIG. 2–FIG. 5.

Figure 2:
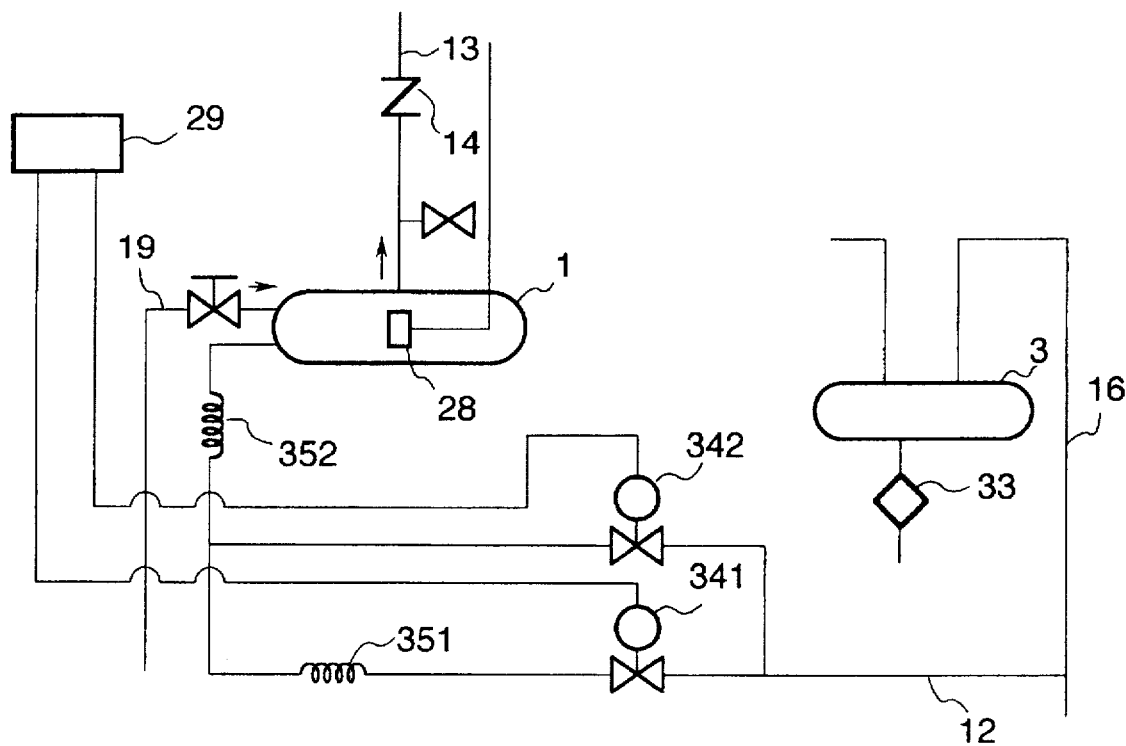
FIG. 2 is a system diagram of the main portion showing another example of a liquid injection arrangement in FIG. 1.

In an example of FIG. 2, a liquid injection control is effected by electromagnetic valves 341 and 342 and capillaries 351 and 352. The electromagnetic valve 341 is opened simultaneously with the start of the compressor 1 so as to prevent the increase of a discharge side temperature of the compressor 1. When the discharge side temperature is further increased, the increased temperature is detected by the thermistor 28, and when it is higher than a set temperature, the electromagnetic valve 342 is opened and an amount of an injected liquid is increased so that the overheat of the compressor 1 can be prevented.

Figure 3:
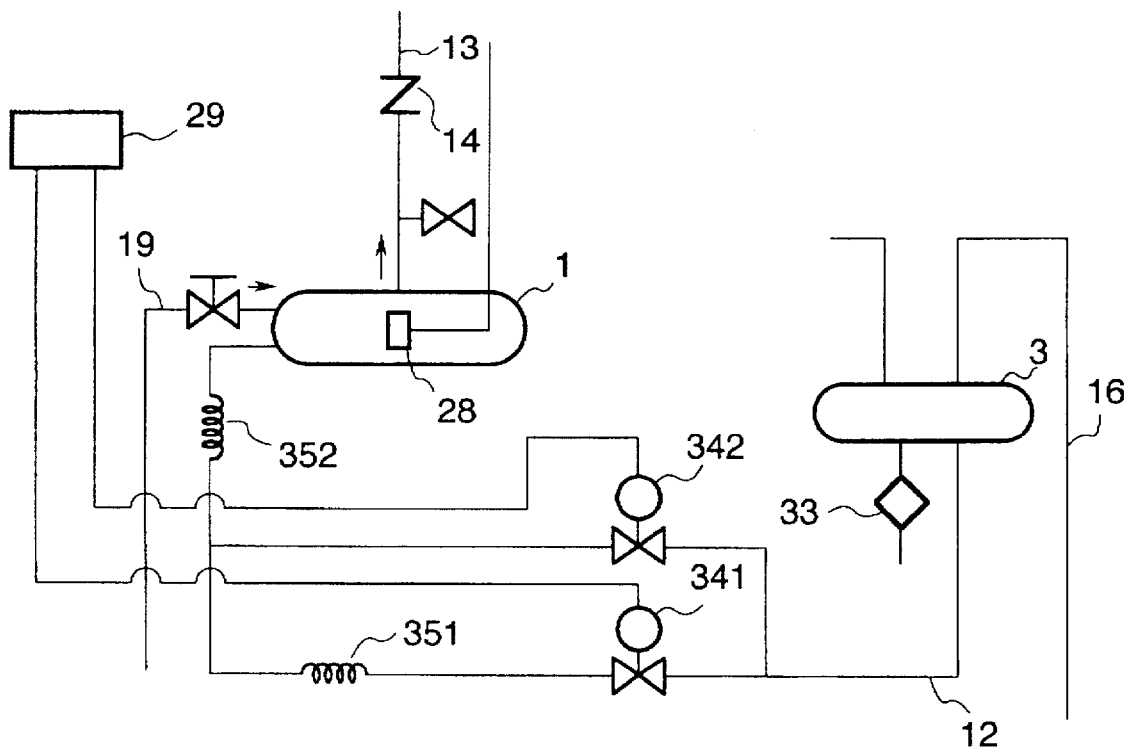
FIG. 3 is a system diagram of the main portion showing a still another example of the liquid injection arrangement in FIG. 1.

An example of FIG. 3 will be described. The example of FIG. 3 is different from that of FIG. 2 in that the liquid injection piping 12 is connected to the lower oil sump of the liquid receiver 3. With this arrangement, a liquid refrigerant can be stably used for a liquid injection control at all times.

Figure 4:
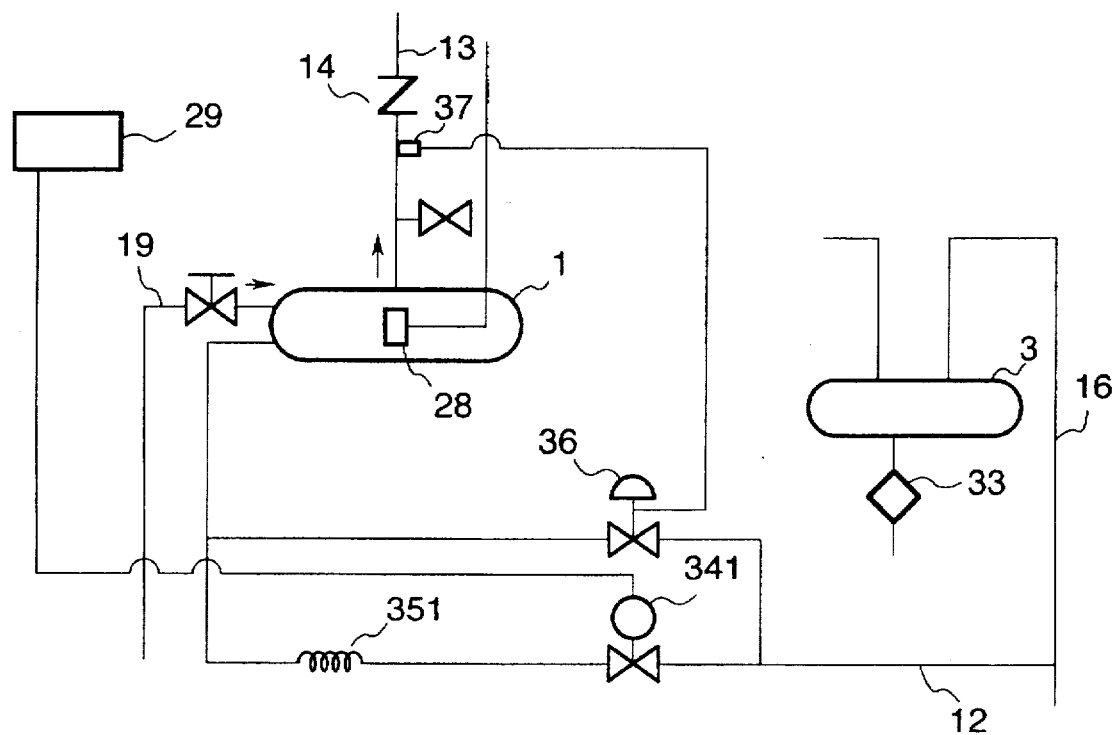
FIG. 4 is a system diagram of the main portion showing a further example of the liquid injection arrangement in FIG. 1.

An example of FIG. 4 will be described. The example of FIG. 4 is different from that of FIG. 1 in that only a liquid injection control is effected. The liquid injection control in the example of FIG. 4 is effected separately using the line of an injection valve 36 and the line of the electromagnetic valve 341 and the capillary 351. The electromagnetic valve 341 is opened simultaneously with the start of the compressor 1 so as to prevent the increase of a discharge side temperature of the compressor 1. Further, when it is found by a temperature or pressure sensor 37 connected to the discharge piping 13 that a temperature or a pressure is higher than a set temperature or pressure, the injection valve 36 is opened, whereas when it is lower than the set temperature or pressure, the injection valve 36 is closed. With this arrangement, the overheat preventing operation of the compressor 1 can be effected so that the refrigerating cycle operation can be stably effected.

Figure 5:
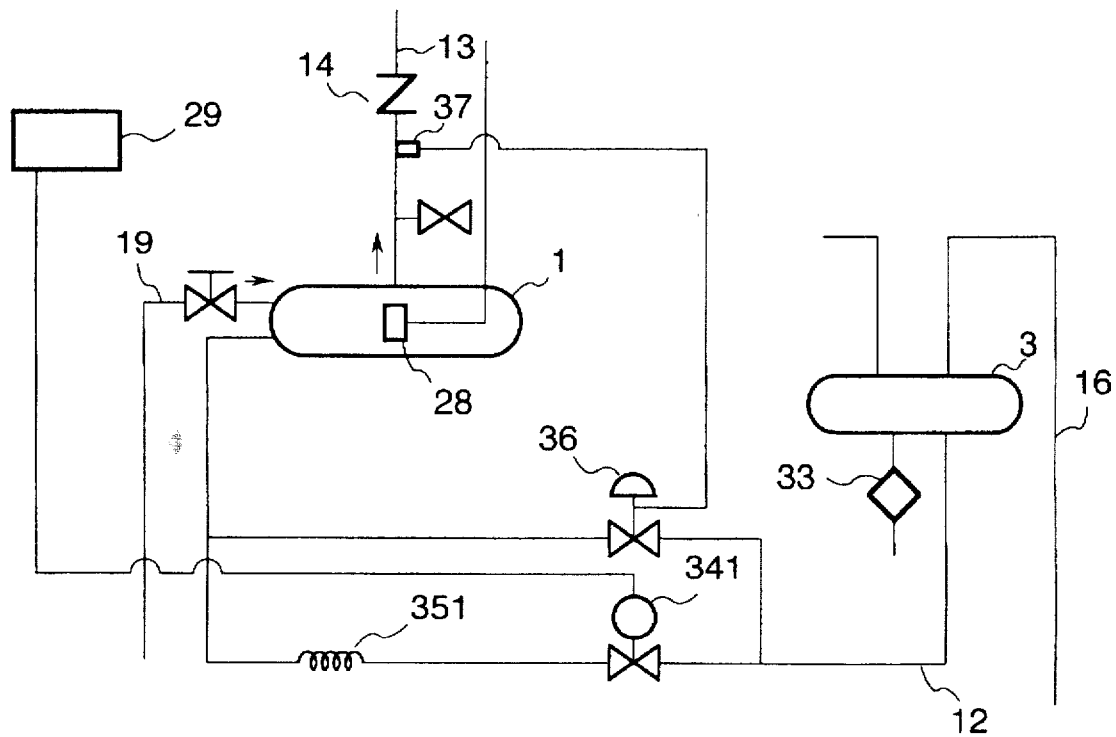
FIG. 5 is a system diagram of the main portion showing a still further example of the liquid injection arrangement in FIG. 1.

Next, an example of FIG. 5 will be described. The example of FIG. 5 is different from that of FIG. 4 in that the liquid injection piping 12 is connected to the lower oil sump of the liquid receiver 3. With this arrangement, a liquid refrigerant can be used for a liquid injection control at all times without causing the shortage of it.

As described above, according to the present invention, since the liquid injection type scroll compressor is used together with the new refrigerator oil having good compatibility with the new refrigerant, the new refrigerant which does not contain chlorine having a possibility for destroying the ozone layer can be used. Thus, there can be obtained an advantage that a stable refrigerating cycle operation can be realized in a wide operating pressure and temperature equivalent to those of a conventional refrigerating apparatus.

Further, since water in the cycle piping can be effectively removed by the dryer complying with the new refrigerant, the reliability of the compressor and other cycle components can be improved and a trouble of the refrigerating apparatus caused by water can be prevented.

What is claimed is:

1. A refrigerating apparatus, comprising:
    a refrigerating cycle composed by sequentially connecting a scroll compressor, a condenser, a liquid receiver, an accumulator, an expansion valve and an evaporator;
    a double-mixed refrigerant composed of 50 wt % of R-125 and 50 wt % of R-143a used as a refrigerant for said refrigerating cycle;
    refrigerator oil composed of ester oil;
    a liquid injection piping connecting the downstream side of said condenser to said scroll compressor;
    means provided in said liquid injection piping for controlling an amount of a liquid injected into said compressor;
    a revolution-controllable motor for driving said scroll compressor;
    a blower for supplying external air to said condenser and a revolution-controllable motor for said blower;

means for detecting a discharge temperature of said compressor;

means for detecting a liquid temperature of said condenser; and means for detecting a temperature of intake air to said condenser, wherein said liquid injection amount control means and the motor of said blower are controlled according to values detected by said detecting means.

2. A refrigerating apparatus according to claim 1, wherein a pressure controller is provided which detects a pressure of said condenser and decreases, when the pressure reaches a preset high pressure value, a capacity of said compressor by decreasing revolutions of said compressor motor, whereas increases, when the pressure reaches a preset low pressure value, a capacity of said compressor by increasing revolutions of said compressor motor.

3. A refrigerating apparatus according to claim 2, wherein when a pressure reaches the preset high pressure value, said pressure controller decreases a high pressure by controlling revolutions of said blower motor to its full speed, whereas when the pressure reaches the preset low pressure value, said pressure controller increases the high pressure by decreasing revolutions of said blower motor.

4. A refrigerating apparatus according to claim 1, wherein a dryer is disposed in said refrigerating cycle to remove water mixed into said refrigerating cycle and a desiccating agent used for said dryer is composed of synthesized zeolite in which each of fine holes extending to molecule adsorbing cavities in a crystal structure has a diameter equal to or less than 3.3 angstroms which is smaller than a molecule of the hydrocarbon fluoride refrigerant which does not contain chloride and larger than a molecule of water.

5. A refrigerating apparatus constituting a refrigerating cycle by sequentially connecting a compressor, a condenser, a liquid receiver, an accumulator, an expansion valve and an evaporator, wherein a triple-mixed refrigerant composed of 44 wt % of R-125, 52 wt % of R-143a and 4 wt % of R-134a is used as a refrigerant for said refrigerating cycle, ester oil is used as refrigerator oil, said compressor is composed of a scroll compressor, the downstream side of said condenser is connected to said scroll compressor through a liquid injection piping, and means for controlling an amount of a liquid injected into said compressor is provided in said liquid injection piping, wherein said condenser uses a heat exchanger whose piping has a diameter smaller than the refrigerant piping of a heat exchanger constituting said evaporator.

6. A refrigerating apparatus constituting a refrigerating cycle by sequentially connecting a compressor, a condenser, a liquid receiver, an accumulator, an expansion valve and an evaporator, wherein a triple-mixed refrigerant composed of 44 wt % of R-125, 52 wt % of R-143a and 4 wt % of R-134a is used as a refrigerant for said refrigerating cycle, ester oil is used as refrigerator oil, said compressor is composed of a scroll compressor, the downstream side of said condenser is connected to said scroll compressor through a liquid injection piping, and means for controlling an amount of a liquid injected into said compressor is provided in said liquid injection piping, wherein the refrigerating piping of said heat exchanger constituting said condenser has a diameter of about 7 mm.

7. A refrigerating apparatus constituting a refrigerating cycle by sequentially connecting a compressor, a condenser, a liquid receiver, an accumulator, an expansion valve and an evaporator, wherein a triple-mixed refrigerant composed of 44 wt % of R-125, 52 wt % of R-143a and 4 wt % of R-134a is used as a refrigerant for said refrigerating cycle, ester oil is used as refrigerator oil, said compressor is composed of a scroll compressor, the downstream side of said condenser is connected to said scroll compressor through a liquid injection piping, and means for controlling an amount of a liquid injected into said compressor is provided in said liquid injection piping, wherein an amount of a liquid injected into said scroll compressor is controlled so that an evaporating temperature of said evaporator covers a range of −60° to +5° C.

8. A refrigerating apparatus, comprising:

a refrigerating cycle composed by sequentially connecting a scroll compressor, a condenser, a liquid receiver, a dryer, an expansion valve, an evaporator, a strainer and an accumulator;

a double-mixed refrigerant composed of 50 wt % of R-125 and 50 wt % of R-143a used as a refrigerant of said refrigerating cycle;

refrigerator oil composed of ester oil;

a liquid injection piping connecting the downstream side of said condenser to said scroll compressor;

means provided in said liquid injection piping for controlling an amount of a liquid injected into said compressor, wherein a desiccating agent used for said dryer is composed of synthesized zeolite in which each of fine holes extending to molecule adsorbing cavities in a crystal structure has a diameter equal to or less than 3.3 angstroms which is smaller than a molecule of the hydrocarbon fluoride refrigerant which does not contain chloride and larger than a molecule of water.

9. A refrigerating apparatus constituting a refrigerating cycle by sequentially connecting a compressor, a condenser, a liquid receiver, an accumulator, an expansion valve and an evaporator, wherein a mixed refrigerant containing at least R-125 and R-143a is used as a refrigerant for said refrigerating cycle, ester oil is used as refrigerator oil and a liquid injection type scroll compressor is used as said compressor, wherein a bypass piping is provided to connect the discharge side piping of said compressor to the outlet side piping of said evaporator and wherein an electromagnetic valve and a check valve are provided in said bypass piping.

10. A refrigerating apparatus constituting a refrigerating cycle by sequentially connecting a compressor, a condenser, a liquid receiver, an accumulator, an expansion valve and an evaporator, wherein a triple-mixed refrigerant composed of 44 wt % of R-125, 52 wt % of R-143a and 4 wt % of R-134a is used as a refrigerant for said refrigerating cycle, ester oil is used as refrigerator oil, said compressor is composed of a scroll compressor, the downstream side of said condenser is connected to said scroll compressor through a liquid injection piping, and means for controlling an amount of a liquid injected into said compressor is provided in said liquid injection piping, wherein said liquid injection amount control means is an electronic expansion valve provided in said liquid injection piping and a controller is provided to adjust an amount of an injected liquid by controlling a degree of opening of said electronic expansion valve in response to a discharge said temperature of said compressor.

11. A refrigerating apparatus, comprising:

a refrigerating cycle composed by sequentially connecting a scroll compressor, a condenser, a liquid receiver, an accumulator, an expansion valve and an evaporator;

a triple-mixed refrigerant composed of 44 wt % of R125, 52 wt % of R143a and 4 wt % of R-134a used as a refrigerant for said refrigerating cycle;

refrigerator oil composed of ester oil;

a liquid injection piping connecting the downstream side of said condenser to said scroll compressor;

means provided in said liquid injection piping for controlling an amount of a liquid injected into said compressor;

a revolution-controllable motor for driving said scroll compressor;

a blower for supplying external air to said condenser and a revolution-controllable motor for said blower;

means for detecting a discharge temperature of said compressor;

means for detecting a liquid temperature of said condenser; and means for detecting a temperature of intake air to said condenser, wherein said liquid injection amount control means and the motor of said blower are controlled according to values detected by said detecting means.

12. A refrigerating apparatus according to claim 11, wherein a pressure controller is provided which detects a pressure of said condenser and decreases, when the pressure reaches a preset high pressure value, a capacity of said compressor by decreasing revolutions of said compressor motor, whereas increases, when the pressure reaches a preset low pressure value, a capacity of said compressor by increasing revolutions of said compressor motor.

13. A refrigerating apparatus according to claim 12, wherein when a pressure reaches the preset high pressure value, said pressure controller decreases a high pressure by controlling revolutions of said blower motor to its full speed, whereas when the pressure reaches the preset low pressure value, said pressure controller increases the high pressure by decreasing revolutions of said blower motor.

14. A refrigerating apparatus according to claim 11, wherein a dryer is disposed in said refrigerating cycle to remove water mixed into said refrigerating cycle and a desiccating agent used for said dryer is composed of synthesized zeolite in which each of fine holes extending to molecule adsorbing cavities in a crystal structure has a diameter equal to or less than 3.3 angstroms which is smaller than a molecule of the hydrocarbon fluoride refrigerant which does not contain chloride and larger than a molecule of water.

15. A refrigerating apparatus, comprising:

a refrigerating cycle composed by sequentially connecting a scroll compressor, a condenser, a liquid receiver, a dryer, an expansion valve, an evaporator, a strainer and an accumulator;

a triple-mixed refrigerant composed of 44 wt % of R125, 52 wt % of R-143a and 4 wt % of R-134a used as a refrigerant of said refrigerating cycle;

refrigerator oil composed of ester oil;

a liquid injection piping connecting the downstream side of said condenser to said scroll compressor;

means provided in said liquid injection piping for controlling an amount of a liquid injected into said compressor, wherein a desiccating agent used for said dryer is composed of synthesized zeolite in which each of fine holes extending to molecule adsorbing cavities in a crystal structure has a diameter equal to or less than 3.3 angstroms which is smaller than a molecule of the hydrocarbon fluoride refrigerant which does not contain chloride and larger than a molecule of water.

16. A refrigerating apparatus constituting a refrigerating cycle by sequentially connecting a compressor, a condenser, a liquid receiver, an accumulator, an expansion valve and an evaporator, wherein a double-mixed refrigerant composed of 50 wt % of R-125 and 50 wt % of R-143a is used as a refrigerant for said refrigerating cycle, ester oil is used as refrigerator oil, said compressor is composed of a scroll compressor, the downstream side of said condenser is connected to said scroll compressor through a liquid injection piping, and means for controlling an amount of a liquid injected into said compressor is provided in said liquid injection piping.

17. A refrigerating apparatus according to claim 16, wherein said refrigerator oil is mainly composed of ester oil of fatty acid and having a dynamic viscosity of 2–70 cSt 40° C. and 1–9 cSt at 100° C. and at least two ester linkages in a molecule.

18. A refrigerating apparatus according to claim 16, wherein said condenser uses a heat exchanger whose piping has a diameter smaller than the refrigerant piping of a heat exchanger constituting said evaporator.

19. A refrigerating apparatus according to claim 16, wherein the refrigerating piping of said heat exchanger constituting said condenser has a diameter of about 7 mm.

20. A refrigerating apparatus according to claim 16, wherein an amount of a liquid injected into said scroll compressor is controlled so that an evaporating temperature of said evaporator covers a range of –60° to +5° C.

21. A refrigerating apparatus according to claim 16, wherein said liquid injection amount control means provided in said liquid injection piping includes an injection valve or an electronic expansion valve provided in said liquid injection piping so as to control an amount of an injected liquid.

22. A refrigerating apparatus according to claim 16, wherein said liquid injection amount control means is an electronic expansion valve provided in said liquid injection piping and a controller is provided to adjust an amount of an injected liquid by controlling a degree of opening of said electronic expansion valve in response to a discharge said temperature of said compressor.

23. A refrigerating apparatus constituting a refrigerating cycle by sequentially connecting a compressor, a condenser, a liquid receiver, an accumulator, an expansion valve and an evaporator, wherein a triple-mixed refrigerant composed of 44 wt % of R125, 52 wt % of R-143a and 4 wt % of R-134a is used as a refrigerant for said refrigerating cycle, ester oil is used as refrigerator oil, said compressor is composed of a scroll compressor, the downstream side of said condenser is connected to said scroll compressor through a liquid injection piping, and means for controlling an amount of a liquid injected into said compressor is provided in said liquid injection piping, wherein said refrigerator oil is mainly composed of ester oil of fatty acid and having a dynamic viscosity of 2–70 cSt 40° C. and 1–9 cSt at 100° C. and at least two ester linkages in a molecule.

* * * * *